US005546663A

United States Patent [19]

Warwicker

[11] Patent Number: 5,546,663

[45] Date of Patent: Aug. 20, 1996

[54] COMPASS HAVING A SQUAT TIP

[75] Inventor: Clive W. Warwicker, Cookley, England

[73] Assignee: Helix Limited, England

[21] Appl. No.: 369,072

[22] Filed: Jan. 5, 1995

[51] Int. Cl.$^6$ ........ G01B 3/16

[52] U.S. Cl. ........ 33/27.02

[58] Field of Search ........ 33/27.02, 27.06, 33/558.2, 558.3, 558.01

[56] References Cited

U.S. PATENT DOCUMENTS

| | | | |
|---|---|---|---|
| 473,244 | 4/1892 | Smith | 33/27.02 |
| 662,291 | 11/1900 | Nye | 33/27.02 |
| 719,381 | 1/1903 | Seymour | 33/27.02 |
| 2,809,437 | 10/1957 | Kuzma | 33/27.02 |
| 5,090,127 | 2/1992 | Shapiro et al. | 33/27.02 |

FOREIGN PATENT DOCUMENTS

| | | | |
|---|---|---|---|
| 2254293 | 10/1992 | United Kingdom . | |
| WO94/05514 | 3/1994 | WIPO | 33/558.01 |

*Primary Examiner*—William A. Cuchlinski, Jr.
*Assistant Examiner*—G. Bradley Bennett
*Attorney, Agent, or Firm*—Cushman Darby & Cushman, LLP

[57] ABSTRACT

FIG. 1 shows a drawing instrument which is in chain dotted lines except for a lower portion of one leg of the instrument. The leg is formed generally of plastics and has a metal end piece provided with a non-needle-like or squat conical tip or point which extends from a circular base.

12 Claims, 1 Drawing Sheet

COMPASS HAVING A SQUAT TIP

FIELD OF THE INVENTION

This invention relates to a drawing instrument, more particularly a drawing compass or dividers having at least one leg provided with a point or tip which enables an arc to be described about said point or tip.

BACKGROUND OF THE INVENTION

Known drawing compasses or dividers have needle-like points or tips which are designed to penetrate or grip the surface of drawing paper or other medium on which a circular arc is to be described, in use. Although different thicknesses of the base of the point and tapering thereof are utilised in varying drawing instruments such points seem always to be of needle-like appearance. In some instances, the point or tip may not be as sharp as it could be in order to increase safety (i.e. the apex of the point or tip may be ground off).

It is, nevertheless, believed that considerable damage could still be inflicted either accidentally or deliberately by the points or tips currently in use on such drawing instruments. Thus, it is believed that such drawing instruments tend to have a disadvantage more particularly regarding the safety of use thereof and this should be particularly apparent where such instruments are designed for use by school children rather than skilled professionals since there would seem to be a high risk of misuse by school children in a potentially dangerous manner.

Sometimes, disadvantageously, rough burrs may be left on the point, due to the manufacturing process and these may present an additional safety hazard capable of causing injury to the skin even when the drawing instrument is not misused.

An additional problem which may arise with known compass points or tips of a needle-like nature is that they can break off or bend or become deformed if mishandled. It is believed that the design of such points or tips can be improved or made safer.

British Patent Specification No. GB 2254293A shows a compass having a plastics leg with an integral blunt point portion. It is believed that the physical dimensions of the point are not as advantageous as they could be in order to optimise grip and yet remain safe. Additionally, it is believed that the integral nature of the point and leg somewhat restricts the design criteria for the leg and may limit both accuracy and durability.

SUMMARY OF THE INVENTION

It is an object of the present invention to provide a drawing instrument having a point or tip improved in at least some safety respect or which at least alleviates one or more of the aforementioned disadvantages or other disadvantage associated with needle-like points or tips.

According to the present invention there is provided a drawing instrument comprising at least one leg having an end with a non-integral squat or non-needle-like point or tip.

By the present invention it is believed that the penetration of said point or tip will be sufficient to anchor the leg in position whilst a circular arc is described about said point/tip but which would not, under normal circumstances, be sufficient to inflict the type of damage that might be possible with a needle-like point or tip.

Preferably, the point or tip is in the form of a shallow cone which has a relatively wide angle at the apex. Preferably, said apex angle provided is in the range of 60° to 120° and is preferably in the order of 90°±10°. Preferably, in order to provide desirable safety aspects said point or tip may extend from a base having a base dimension of 3 mm or more. Said base will usually be circular.

In an alternative embodiment said point or tip may be of pyramid shape rather than being conical and thus the base may be square or of any other polygonal shape.

The apex will usually be centrally aligned with the base although it could be offset relative to the base and/or leg axis preferably in a direction towards the point or "pencil" end of an associated leg of the drawing instrument in order possibly to aid in setting the selected drawing arc more particularly where small arcs are required.

It is envisaged that usually the height of the apex above the base of the point or tip will be less than or equal to a dimension of the base and will not be substantially greater than said base dimension.

In one embodiment of the present invention, said end is formed as a separate metal piece having a stem which is inserted (generally axially of the associated leg or leg receiving boss) into a receiving hole at a free end of the remaining portion of the leg. The engagement of said stem with the leg or boss may be by way of a force or friction fit or any other suitable engagement. Additionally, and advantageously, the end piece may be formed with an annular shoulder which engages an end rim of the leg portion surrounding said hole in order to govern the depth of penetration of the stem into the leg so that the portion of the end piece projecting beyond the hole can be accurately determined.

The material of the end piece may be a metal such as medium carbon steel which is hardened and tempered and the tip may be made by turning or milling of the end piece. The end piece may be inserted into a hole formed in a plastics portion of the leg.

Providing a separate tip for insertion into said leg portion, advantageously, allows a much tougher or more durable material (and thus more expensive) material to be utilised for the tip of the leg than for the remainder of the leg portion.

It is possible that the point or tip may be fashioned in metal (e.g. steel) and could be an integral part of the leg.

Further according to the present invention there is provided a non-needle-like or squat point or tip for attachment to, or as an integral metal part of, a leg of a drawing instrument.

Further according to the present invention there is provided a method of making a point or tip of a drawing instrument, said method comprising turning or milling said point or tip in such a manner that no burr is provided on or adjacent the apex thereof.

Still further according to the present invention there is provided a drawing instrument having a leg with a safety non-penetrating point or tip made by turning.

Still further according to the present invention there is provided a leg of, or for, a drawing instrument, said leg having an end with a conical, tapered or pyramidal tip or the like having a base dimension of at least 3 mm and an apex angle greater than or equal to 60°.

Still further according to the present invention there is provided a point or tip for attachment to a leg portion of a drawing instrument, said point or tip having a shoulder or other means engaging said leg portion thereby allowing a predetermined extent of said end to project beyond said remainder of the leg.

Still further according to the present invention there is provided a drawing instrument having a leg portion with a stem of an end piece inserted or moulded therein, said end piece terminating in a squat or non-needle point.

BRIEF DESCRIPTION OF THE DRAWINGS

An embodiment of a drawing instrument in accordance with the present invention will now be described by way of example only with reference to the accompanying drawings in which.

DESCRIPTION OF THE PREFERRED EMBODIMENTS

Figure 1:
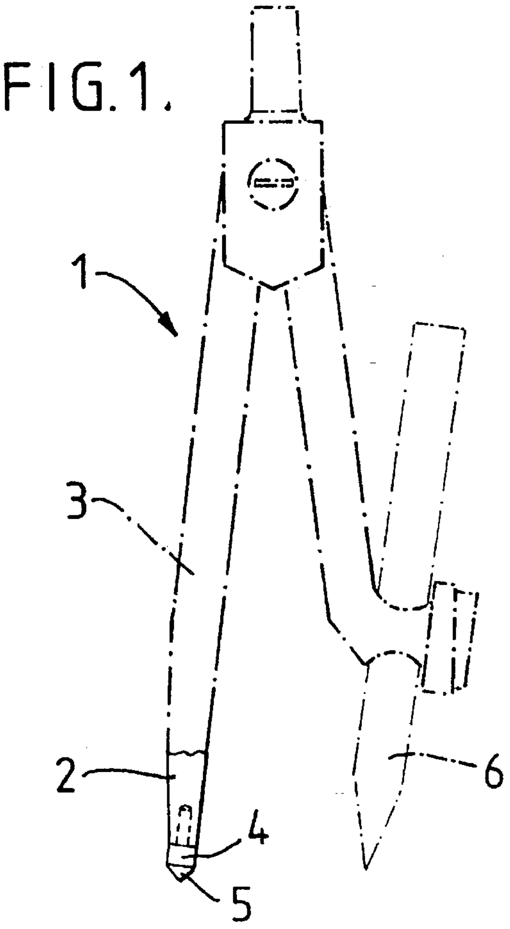
FIG. 1 shows a drawing instrument in the form of a drawing compass with one leg having an end provided with a squat or non-needle-like point.

FIG. 1 shows a drawing instrument 1 which is in chain dotted lines except for a lower portion 2 of one leg 3 of the instrument. In this embodiment the leg 3 is formed generally of plastics (which may or may not be provided with a metal insert extending along a substantial length of the leg) and has a metal end piece 4 provided with a non-needle-like or squat conical tip or point 5 which extends from circular base 5*a*.

Figure 2:
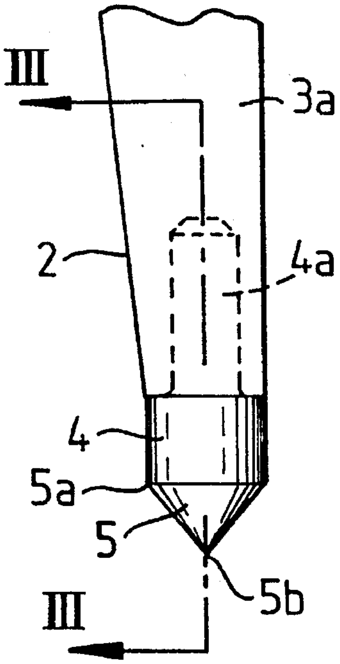
FIG. 2 shows an enlarged view of a portion of the leg having the non-needle-like point or tip.
Figure 3:
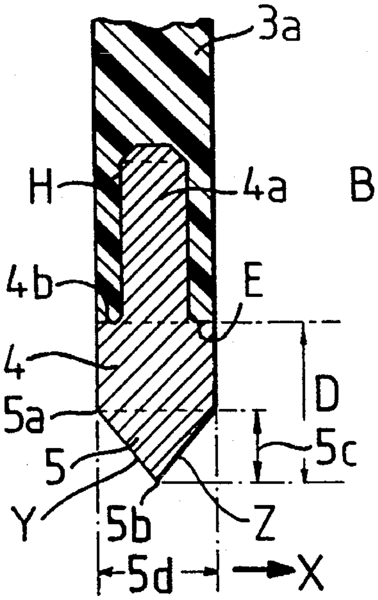
FIG. 3 shows a sectional view taken on the line III—III of FIG. 2.

FIGS. 2 and 3 show the endpiece 4 in greater detail. The conical point or tip 5 has a sharp apex 5*b* and the apex angle as shown is in the order of 80°. Thus the point or tip 5 is squat in nature with the height of the cone 5*c* (see FIG. 3) being somewhat less than the diameter 5*d* of the circular base 5*a*.

The point or tip 5 is designed in such a way that there will be sufficient grip or penetration into a sheet of drawing paper or other medium (not shown) to allow a circular arc to be described with the pencil 6 (see FIG. 1) about the point 5, yet it is believed that the squat non-needle-like nature of said point or tip represents a very significant improvement in safety aspects of the instrument 1. This is because the point 5 itself has a very low penetration factor when compared to a needle or point presently utilised in such drawing instruments. Quite simply, there is a greatly reduced risk of complete penetration of the skin with the point 5 than with the points of other compasses should a person (for example a schoolchild) be deliberately or accidentally stabbed with said point. In this respect it is important to note that the diameter of the base is much wider than the diameter of compass points currently in use. The diameter 5*d* of the base 5*a* is 3.25 mm as shown in FIG. 3 and it is believed that the safety properties of the point or tip are best when the diameter of the circular base is at least 3 mm.

The end piece 4 itself is made of medium carbon steel which is hardened and tempered and the point may be made from turning in such a manner that the apex is sharp and free from any burring which could also be detrimental to safety.

In the embodiment shown in FIGS. 1 to 3, the end piece 4 is provided with a stem 4*a* extending coaxially of the circular base 5*a* into a receiving hole H at the bottom of the plastics portion 3*a* of the leg 3. In this embodiment the stem 4*a* is held in the hole H by a force or friction fit and the end piece 4 is provided with an annular shoulder 4*b* which surrounds the hole H and engages the plastics end rim E of the leg portion 3 so that the depth D of the portion of the end piece 4 extending beyond the plastics portion 3*a* of the leg 3 is accurately determined automatically as the end piece 4 is assembled in position in the hole H. This factor is itself an advantage over other compasses in which a needle point is inserted into a plastics portion of the leg, said needle point not being provided with any locating shoulder or means accurately determining the depth of insertion.

In an alternative arrangement the stem 4*a* of the end piece 4 could be insert moulded into the leg 3.

Figure 4:
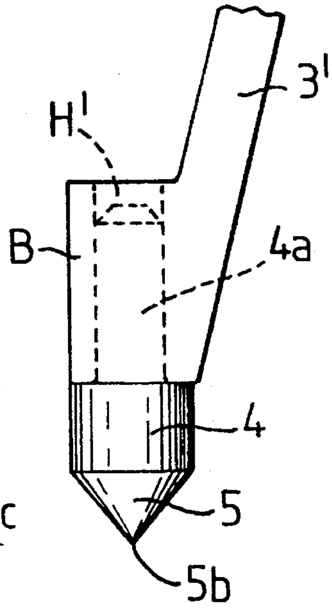
FIG. 4 shows a view similar to FIG. 2 but with the non-needle-like tip being provided on a different configuration of leg of the drawing instrument.

The arrangement shown in FIG. 4 is similar to that previously discussed but the end piece 4 is now inserted into a through hole H' provided in known manner in a receiving boss B of metal leg 3' of a drawing instrument (not shown). Once again the shank 4*a* is inserted into the hole H' as a force or friction fit but retention of said stem 4*a* in the hole H' could be by any alternative or additional means. Boss B is inclined to the axis of the leg 3'.

The precise shape of the point or tip 5 may be altered to suit and the configuration of the base 5*a* may also be different to that shown. For example, the apex angle could be in the range 60° to 120° and is preferably 90°±10° in order to provide a relatively low penetration factor. The base 5*a* may be of square, rectangular, triangular or of any polygonal (regular or otherwise) cross section with the point or tip possibly being a pyramid rather than a cone or tapered in some way towards the apex.

As shown the apex 5*b* is axially aligned with the base 5*b* but in an alternative embodiment the apex could be offset relative to the base in the direction X as shown more particularly in FIG. 3, which is in a direction towards the pencil 6 as shown in FIG. 1. Offsetting of the apex 5*b* in this manner may perhaps allow a more accurate setting of arc radius more particularly for smaller radii. Once again it is possible that the end piece 4 may be inserted into the leg 3 at a slight angle to the leg axis in order to achieve a similar effect. It is to be noted that the apex 5*b* is already at an angle to the leg axis of leg 3' in FIG. 4.

Once again it is possible that the non-needle-like point may be integrally formed with the leg whatever the material of said leg (for example metal or plastics).

Usually the base 5*a* of the end piece 4 will be constructed so that it has a minimum width of 3 mm or more. Also the sharp apex 5*b* may possibly be replaced by a different configuration to increase the safety aspects still further provided there is still sufficient grip to enable the point or tip to be satisfactorily located on the paper or other drawing medium whilst a circular arc is described about said tip or point.

Where the drawing instrument is a pair of dividers each leg may terminate in such a point or tip 5.

Sometimes drawing instruments are provided with replaceable points or tips and it is envisaged that the scope of the invention would extend to such replaceable tips or points of the non-needle-like or squat nature as herein described. It is possible that the drawing instrument could be provided with a number of points or tips having a base and/or apex angle varying from one another so that the user can select the most suitable tip or point for his/her own use for a given drawing exercise.

Typically the apex angle of a needle-like point or tip is in the order of only 9° or less with a base diameter of about 1,575 mm resulting in a needle-like or elongate point or tip or spike in contrast to the safety point 5 of the present invention. In said prior art needle-like point, the height of the point above the base is in the order of 10 mm so that the ratio of the height of the point to the diameter of the base is given by the following formula:

$$\frac{p}{d}=\frac{10}{1.575}\ 6.35$$

where p=the height of the apex above the base and d=the diameter of the base.

In the present invention it is believed that the ratio of p to d should be in the order of 0.87 or less. Preferably, the height of the apex above the base is less than or equal to the maximum width of the base dimension and in any event the ratio of p to d should be substantially less than 6.34.

Of course the point or tip 5 need not necessarily be conical or pyramidal in shape.

In an alternative embodiment the diameter of the base may be 4 mm but the base is usually not wider than the end of the leg portion to which it is attached.

As shown in FIG. 3, the cross section of the end piece 4 includes straight line portions Y and Z inclined towards one another to meet at the apex 5*b* and it is conceivable that the straight lines Y and Z could be a different shape for example, slightly outwardly curved or convex, giving a somewhat bulbous rounded or dome appearance although sufficient grip should be provided for at the apex.

It is worth noting that standard pencils sharpened by pencil sharpeners giving a relatively wide apex angle have a ratio of p to d in the order of 1.55 and preferably the point or tip in accordance with the present invention has a ratio of p to d less than or equal to 2 and more preferably less than or equal to 1.55.

It is believed that the relative dimensions of said end piece 4 are generally optimised as shown in FIGS. 1 to 4 of the drawings.

It is to be understood that the scope of the present invention is not to be unduly limited by the particular choice of terminology and that a specific term may be replaced by any equivalent or generic term. Further it is to be understood that individual features, method or functions related to the tip or point or drawing instrument might be individually patentably inventive. In particular, any disclosure in this specification of a range for a variable or parameter shall be taken to include a disclosure of any selectable or derivable subrange within that range and shall be taken to include a disclosure of any value for the variable or parameter found within or at an end of the range. The singular may include the plural and vice versa.

What we claim is:

1. A drawing instrument comprising:

first and second legs each having first and second longitudinal ends, said second longitudinal ends of said first and second legs being operatively coupled together, at least one leg having a tip mounted to said first longitudinal end thereof, said tip including a generally conical portion having an apex, a height of said apex relative to a base of said conical portion being less than or equal to a diameter of said tip at said base of said conical portion, said tip being formed as a separate metal piece having a stem which is inserted into a receiving hole defined at said first longitudinal end of the leg, said separate metal piece being formed with an annular shoulder which engages an end rim of said first longitudinal end of said leg, surrounding said hole.

2. An instrument as claimed in claim 1 in which the conical portion of said tip has a wide apex angle in the range of 60° to 120°.

3. An instrument as claimed in claim 1 in which said base of said conical portion has a diameter of at least 3 mm.

4. An instrument as claimed in claim 1 in which the base of said conical portion is generally circular.

5. An instrument as claimed in claim 1 in which said tip is of pyramid shape.

6. An instrument as claimed in claim 1 in which the apex of the tip is centrally aligned with the base of said conical portion.

7. An instrument as claimed in claim 1 in which insertion of said stem into said receiving hole results in a friction fit.

8. An instrument as claimed in claim 1 in which the tip is inserted into a hole formed in a plastics portion of said at least one leg.

9. A drawing instrument as claimed in claim 1 wherein the stem of said tip is moulded to the first longitudinal end of the leg.

10. An instrument as in claim 1, wherein said tip further comprises a generally cylindrical portion extending axially between said first longitudinal end of said leg and said base of said conical portion.

11. An instrument as in claim 2, wherein said apex angle is in the range of 80°–100°.

12. An instrument as in claim 1, wherein said tip is formed from hardened and tempered medium carbon steel.

* * * * *